Dec. 28, 1926.

L. D. SOUBIER 1,612,658

APPARATUS FOR FEEDING MOLTEN GLASS

Filed May 12, 1923   3 Sheets-Sheet 1

Fig. I

INVENTOR

LEONARD D. SOUBIER

BY J. F. Rule

HIS ATTORNEY

Dec. 28, 1926.

L. D. SOUBIER 1,612,658

APPARATUS FOR FEEDING MOLTEN GLASS

Filed May 12, 1923    3 Sheets-Sheet 2

INVENTOR
LEONARD D. SOUBIER
BY J. F. Rule.
HIS ATTORNEY

Dec. 28, 1926.                                     1,612,658
L. D. SOUBIER
APPARATUS FOR FEEDING MOLTEN GLASS
Filed May 12, 1923      3 Sheets-Sheet 3
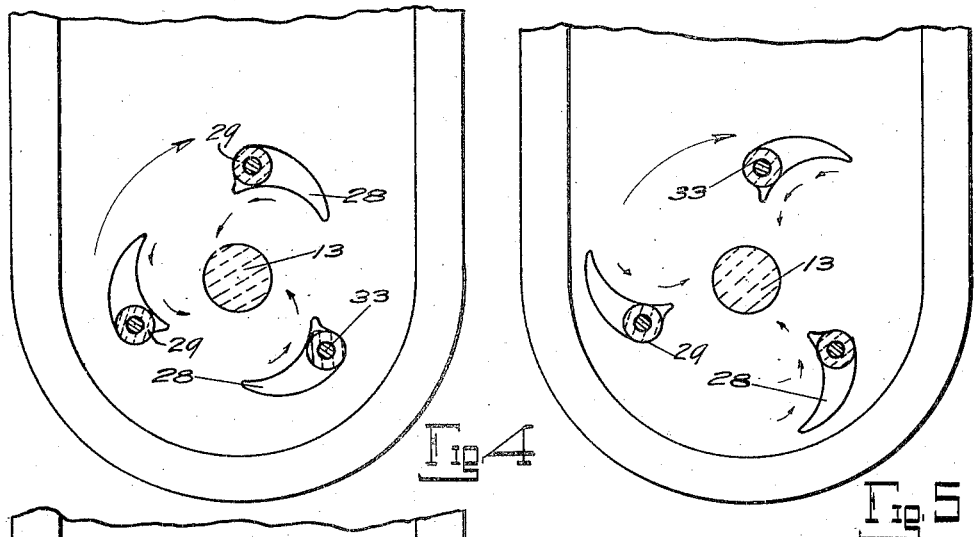
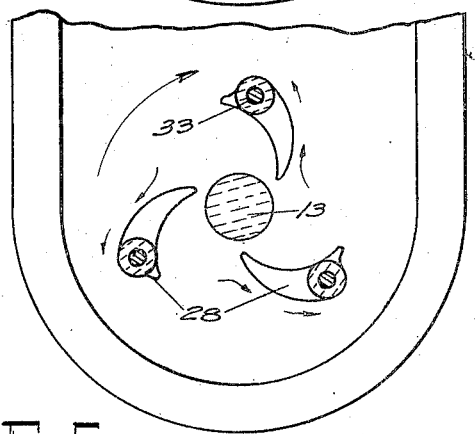
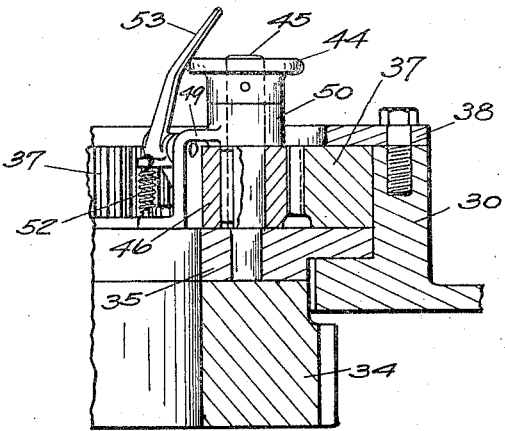
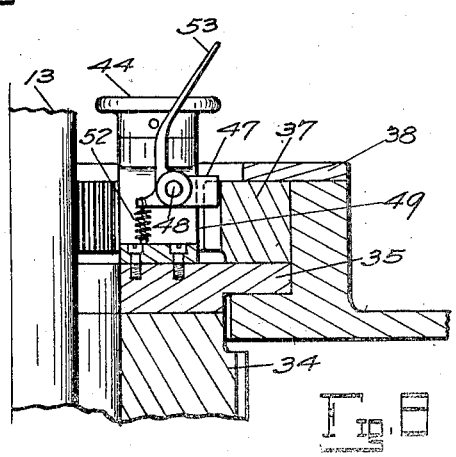
INVENTOR
LEONARD D. SOUBIER
BY J. F. Rule
HIS ATTORNEY Patented Dec. 28, 1926.

1,612,658

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR FEEDING MOLTEN GLASS.

Application filed May 12, 1923. Serial No. 638,462.

My invention relates to glass feeders for forming and delivering charges of molten or plastic glass suitable for entering the molds of a glass forming machine. The invention is particularly adapted for use with a type of feeder in which the glass is delivered through an outlet opening in the bottom of a container. The discharge may be regulated and controlled by the usual vertically reciprocating plug or regulator working in the glass over the opening.

The present invention relates particularly to means for maintaining a circulation of the glass around the axis of the outlet to thereby produce or maintain a homogeneous supply of glass at a uniform temperature, thus avoiding an uneven or one-sided chilling of the glass surrounding the outlet and preventing cold streaks or unevenness of temperature in the issuing glass.

An object of the invention is to provide a novel and practical means for adjusting the stirring devices, to thereby vary their action on the glass. Such adjustment is necessary to secure the best results under varying conditions of temperature, rate of flow, character of glass and other factors which enter into the practical operation of such feeders.

Other objects of the invention will appear hereinafter.

The present application discloses certain features also disclosed in my co-pending application, Serial Number 635,212, filed April 28, 1923.

In the accompanying drawings:

Figure 4 is a sectional plan view at the plane of the line IV—IV on Figure 2.

Figures 5 and 6 are views similar to Figure 4, but with the stirring devices adjusted to different positions.

Figure 7 is a section at the line VII—VII on Figure 3.

Figure 8 is a section at the line VIII—VIII on Figure 3.

Figure 1:
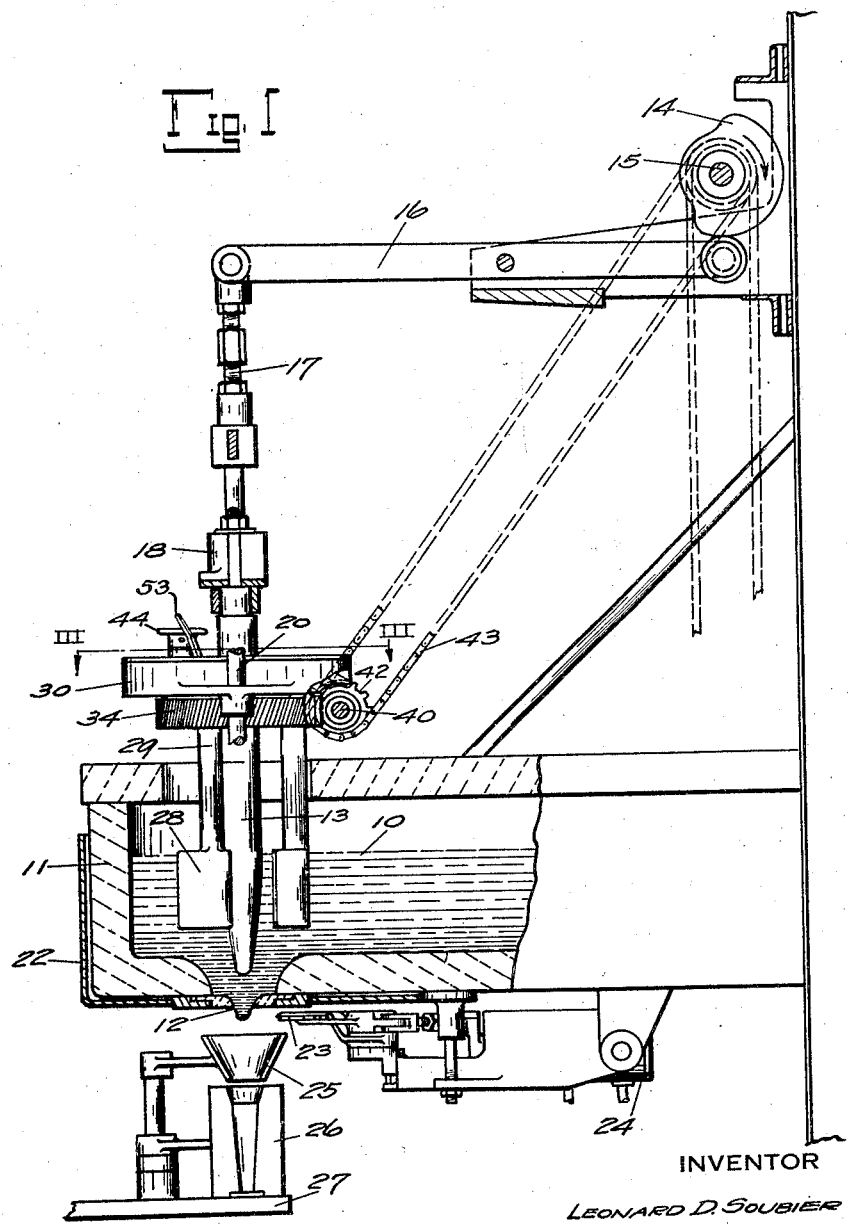
Figure 1 is a part sectional elevation of glass feeding apparatus embodying the present invention.
Figure 2:
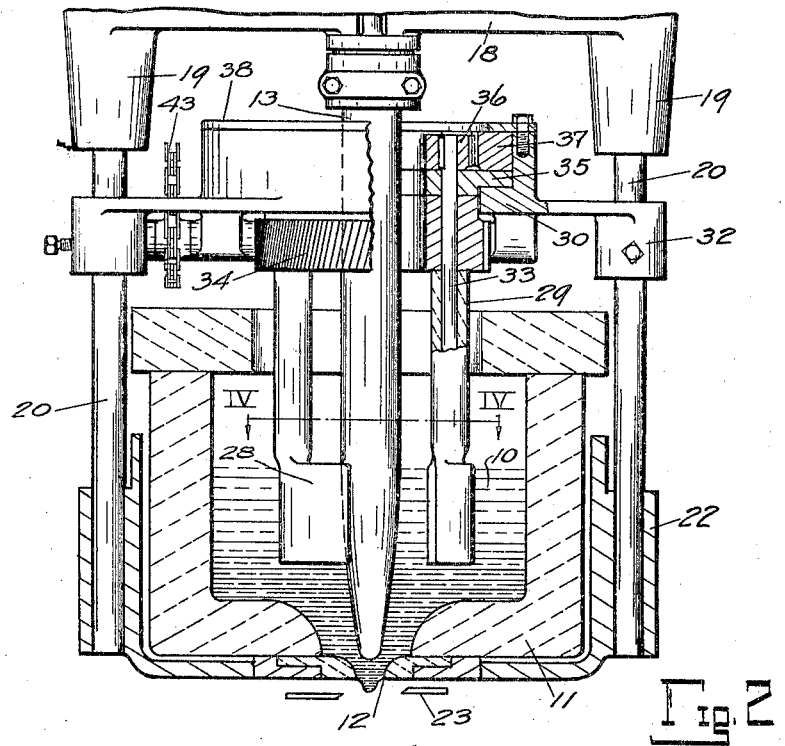
Figure 2 is a part sectional elevation looking in a direction at right angles to that of Figure 1.
Figure 3:
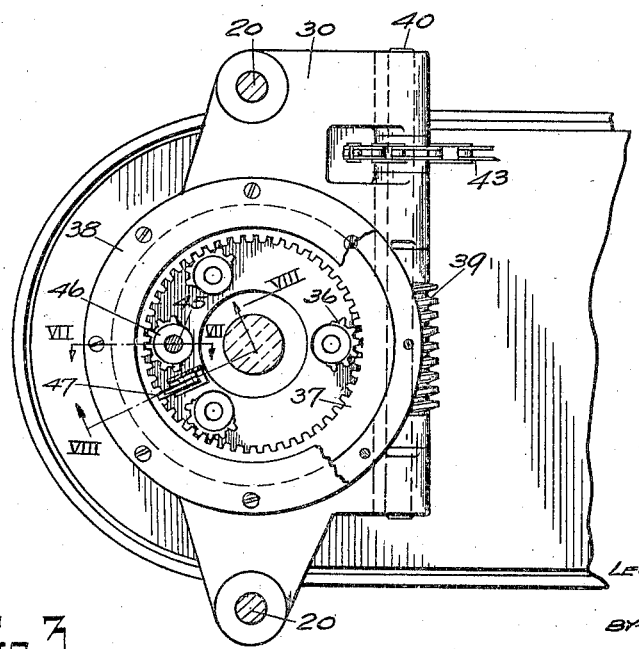
Figure 3 is a sectional plan at the plane of the line III—III on Figure 1.

Molten glass 10 is continuously supplied to the container 11, which may be the usual furnace forehearth or boot provided with an outlet opening 12 in the bottom thereof through which the glass issues. The discharge of glass is regulated and controlled by a regulator 13 which may consist of a vertically reciprocating plug or plunger operating in a manner well known to those versed in the art. The plunger is operated by a cam 14 on a continuously rotating drive shaft 15, said cam operating through a lever 16 which has an adjustable connection 17 with a yoke 18 which carries the plunger. The yoke has bearing sleeves 19 slidable up and down on stationary guiding rods or standards 20 extending upward from the frame 22 which supports the boot 11. Shears 23 are periodically actuated by a motor 24 to sever the charges of issued glass depending from the outlet. The charges are dropped through funnel guides 25 into molds 26 on the carriage 27 of a glass forming machine.

The stirring devices comprise blades 28 of fire clay or other refractory material, said blades being formed at the lower ends of stems 29 and including portions projecting laterally from the axes of the stems. The stirring mechanism is supported by an annular member 30 having bearing lugs 32 mounted on the standards 20. The stirring devices are reenforced by metal rods 33 which extend through the stems 29. Said rods extend upward beyond the stems through a ring gear 34 and a bearing ring 35, the latter being directly supported on the stationary ring member 30. Keyed to the upper end of each shaft 33 is a segmental gear pinion 36. Said pinions mesh with an internally toothed annular gear 37 supported on the ring 35. The gear 37 is held in place by a removable cover ring 38.

The gear 34, herein shown as a worm gear, is driven by a worm 39 on a shaft 40 journalled in the member 30. A sprocket wheel 42 on the shaft 40 is driven by a sprocket chain 43 which runs over a sprocket wheel fixed on the drive shaft 15.

The angular position of the stirring blades 28 including the lateral portions may be adjusted by rotating the adjusting ring 37 relative to the ring 35, thereby rotating the pinions 36. This adjustment may be effected by a hand wheel 44 keyed to a shaft 45 carrying a pinion 46 in mesh with the gear 37. The parts are locked in adjusted position by a locking latch 47 mounted on a pivot pin 48 in a bracket 49 which provides a bearing sleeve 50 for the shaft 45. The latch 47 is normally in engagement with the gear 37, as shown in Figure 8, and may be depressed by a finger piece 53, against the tension of a spring 52, to release it from the gear. This permits the hand wheel 44 to be rotated, thereby rotating the ring 37 and simultaneously adjusting the several stirring devices. This adjustment may readily be effected while the feeder is in operation.

In operation, the stirring devices 28 are revolved continuously around the axis of the plunger 13 in a clockwise direction (Fig. 4) and thereby maintain a continuous circulation of glass around the axis of the outlet. In this manner, stagnation or cooling of the glass in front of the plunger is prevented and homogeneity and uniformity of temperature of the issuing glass is maintained. When the stirring paddles 28 are adjusted to the Figure 4 position, they encounter comparatively little resistance in their travel through the glass, so that the stirring action is reduced to a minimum. It will be noted that in this position the inner and outer curved faces of the paddles are substantially concentric with their path of travel.

When the paddles are adjusted outwardly to the Figure 5 position, they have a more positive action on the glass. In this position, they reach well out toward the walls of the container and tend to force the glass inward toward the plunger. Their stirring action is very effective in this position.

When adjusted inward to the Figure 6 position, the paddles deflect the glass outwardly away from the plunger and tend to reduce the amount of glass issuing from the outlet. They also assist the plunger in periodically retarding the issuing glass. The particular position to which the stirring paddles should be adjusted to secure the best results depend in a large measure on the condition and temperature of the glass, the size of the charges, the speed at which the feeder is operated and other conditions which in practice are not uniform.

Modifications may be resorted to within the spirit and scope of my invention.

What I claim is:

1. In a glass feeder, the combination of a container for molten glass having an outlet opening through which the glass issues, a glass circulating means projecting laterally from an axis at one side of the outlet opening, means for moving said circulating means around the axis of the outlet opening for causing a circulation of glass around the axis of said opening, and adjusting means for varying the effectiveness of said circulating means.

2. In a glass feeder, the combination of a container for molten glass having an outlet opening through which the glass issues, a glass circulating means projecting laterally from an axis at one side of the outlet opening, means for moving said circulating means around the axis of the outlet opening for causing a circulation of glass around the axis of said opening, and a manually operable adjusting device for adjusting said circulating means about its axis, said manual device being operable while the feeder is in operation.

3. Glass feeding mechanism comprising in combination, a receptacle for molten glass having an outlet opening in the bottom thereof through which the glass issues, a circulating device extending into the glass, and projecting laterally from a vertical axis at one side of the outlet opening, means to effect a relative rotation of said device and the receptacle around the axis of said opening, and means for adjusting said device about its axis toward or from the axis of the outlet opening.

4. Glass feeding mechanism comprising in combination, a receptacle for molten glass having an outlet opening in the bottom thereof through which the glass issues, a circulating device extending into the glass and projecting laterally from a vertical axis at one side of the outlet opening, means to effect a relative rotation of said device and the receptable around the axis of said opening, and adjusting means for angularly adjusting said device and thereby varying the effectiveness of said device.

5. In a glass feeder, the combination of a receptacle for molten glass having an outlet opening in the bottom thereof, a stirring paddle projecting downward into the glass and laterally from a vertical axis at one side of the outlet, means for revolving the paddle around the axis of the outlet, and means for adjusting the angular position of the paddle.

6. In a glass feeder, the combination of a receptacle for molten glass having an outlet opening in the bottom thereof, a stirring paddle projecting downward into the glass and laterally from a vertical axis at one side of the outlet, and means for causing the paddle to move in a closed path around the axis of the outlet opening.

7. The combination of a furnace tank having a laterally projecting boot or extension forming a part thereof, said extension having a bottom outlet opening, a stirring paddle projecting downwardly into the glass and laterally from a vertical axis at one side of said opening, means for revolving said paddle around the vertical axis of said opening, and means for angularly adjusting the paddle about its own axis.

8. In a glass feeder, the combination of a receptacle for molten glass having an outlet opening in the bottom thereof, a stirring paddle projecting downward into the glass laterally from a vertical axis at one side of the outlet, and automatic means for continuously revolving the paddle about the axis of the outlet.

9. The combination of a receptacle to contain molten glass provided with an outlet opening in the bottom thereof, a series of stirring devices projecting into the glass and laterally from vertical axes spaced from the outlet opening, means to effect a relative rotation of said devices and container about the axis of said opening, and mechanism for simultaneously adjusting glass circulating portions of each of said devices toward or from the opening.

10. The combination of a container for molten glass having an outlet opening in the bottom thereof, a regulating plug projecting into the glass over said opening, means to periodically reciprocate said plug, a stirring device projecting into the glass laterally from an axis at one side of the plug, means to revolve said device about the axis of the plug, and means for adjusting a glass stirring portion of said device around its axis and toward or from said axis.

11. The combination of a container for molten glass having an outlet opening in the bottom thereof, a regulating plug projecting into the glass over said opening, means to periodically reciprocate said plug, a stirring paddle projecting into the glass laterally from an axis at one side of the plug, means for revolving said paddle around the plug, and means for adjusting the angular position of the paddle to vary its effectiveness and the direction of flow of glass.

12. The combination of a container for molten glass having an outlet opening in the bottom thereof, a regulating plug projecting into the glass over said opening, means to periodically reciprocate said plug, a plurality of stirring paddles arranged around the plug and projecting into the glass, said paddles having upwardly projecting stems, pinions on said stems, a ring gear engaging said pinions, and means to rotate said gear and thereby simultaneously adjust the paddles about the axes of said stems.

13. The combination of a container for molten glass having an outlet opening in the bottom thereof, a regulating plug projecting into the glass over said opening, means to periodically reciprocate said plug, a plurality of stirring paddles arranged around the plug and projecting into the glass, said paddles having upwardly projecting stems, pinions on said stems, a ring gear engaging said pinions, means to rotate said gear and thereby simultaneously adjust the paddles about the axes of said stems, means to lock said gear in adjusted position, a rotatable member carrying said gear, and automatic means to rotate said member and thereby revolve the paddles around the plug.

14. In a glass feeder, the combination of a receptacle to contain molten glass and having an outlet opening in the bottom thereof, a stirring paddle within the glass at one side of said opening, means to revolve said paddle about the axis of said opening, and means for adjusting the paddle into positions to deflect the glass either toward or away from said axis.

15. A container for molten glass having an outlet opening in the bottom thereof, stirring means comprising a plurality of paddles symmetrically arranged around the vertical axis of said opening, means to revolve said paddles about said axis and thereby cause a circulation of glass around said axis, and adjusting means for angularly adjusting the paddles into positions for deflecting the glass toward or from said axis.

16. In a glass feeder, the combination of a receptacle for molten glass having an outlet opening in the bottom thereof, a stirring paddle projecting downward into the glass and laterally from a vertical axis at one side of the opening, means for bodily moving the paddle through the glass and thereby stirring the glass, and means for adjusting the angular position of the paddle and thereby changing its path of movement through the glass.

17. In a glass feeder, the combination of a receptacle for molten glass having an outlet opening in the bottom thereof, a stirring paddle projecting downward into the glass at one side of the opening, means for effecting a relative rotative movement of the paddle and receptacle about the vertical axis of said opening, and means for adjusting the paddle about a vertical axis at one side of said first mentioned axis, the paddle comprising a blade whose angular position is adjusted by said adjustment of the paddle.

Signed at Toledo, in the county of Lucas and State of Ohio, this 9th day of May, 1923.

LEONARD D. SOUBIER.